(12) United States Patent
Resendes et al.

(10) Patent No.: US 7,649,033 B2
(45) Date of Patent: *Jan. 19, 2010

(54) FILLED ELASTOMERIC COMPOUNDS AND METHODS FOR PREPARING SAME

(75) Inventors: R. Resendes, Sarnia (CA); Shayna Odegaard, London (CA)

(73) Assignee: Lanxess Inc., Sarnia, Ontario (CA)

( * ) Notice: Subject to any disclaimer, the term of this patent is extended or adjusted under 35 U.S.C. 154(b) by 40 days.

This patent is subject to a terminal disclaimer.

(21) Appl. No.: 10/774,722

(22) Filed: Feb. 9, 2004

(65) Prior Publication Data

US 2005/0075422 A1 Apr. 7, 2005

(30) Foreign Application Priority Data

Feb. 13, 2003 (CA) .................................... 2418822

(51) Int. Cl.
*C08K 9/04* (2006.01)
(52) U.S. Cl. ...................... 523/210; 523/216; 524/445; 524/492; 524/493
(58) Field of Classification Search ................. 523/210, 523/216; 524/445, 492, 493
See application file for complete search history.

(56) References Cited

U.S. PATENT DOCUMENTS

| | | | | |
|---|---|---|---|---|
| 3,337,391 A | * | 8/1967 | Jaruzelski et al. ........... 428/441 |
| 6,180,710 B1 | * | 1/2001 | Hergenrother et al. ...... 524/494 |
| 6,706,804 B2 | * | 3/2004 | Resendes ...................... 524/552 |
| 6,992,122 B2 | * | 1/2006 | Resendes et al. ............. 523/209 |
| 7,015,265 B2 | * | 3/2006 | Resendes et al. ............. 524/381 |
| 2002/0156173 A1 | * | 10/2002 | Hopkins et al. .............. 524/492 |
| 2003/0119967 A1 | | 6/2003 | Resendes et al. ............. 524/492 |
| 2004/0030028 A1 | | 2/2004 | Resendes et al. ............. 524/493 |

FOREIGN PATENT DOCUMENTS

| | | |
|---|---|---|
| CA | 2293149 | 6/2001 |
| CA | 2 339 080 | 9/2002 |
| CA | 2368383 | 7/2003 |

OTHER PUBLICATIONS

European Search Report for EP 1 447 424 A1.*
European Search Report for EP 1 362 884 A1.*
M.M. Goldberg, publ. "Chimia", Moscow, 1978, p. 406 and 407.

* cited by examiner

*Primary Examiner*—Peter Szekely
(74) *Attorney, Agent, or Firm*—Michael A. Miller

(57) ABSTRACT

The invention provides a process for preparing a filled halobutyl elastomer, which includes mixing a halobutyl elastomer with at least one mineral filler that has been reacted with at least one organic compound containing at least one basic nitrogen-containing group and at least one hydroxyl group and, optionally, with at least one silazane compound before admixing the filler with the halobutyl elastomer and optionally curing the filled elastomer with sulfur or other curative systems.

27 Claims, 8 Drawing Sheets

FILLED ELASTOMERIC COMPOUNDS AND METHODS FOR PREPARING SAME

FIELD OF THE INVENTION

The present invention relates to silica-filled halogenated butyl elastomers, such as bromobutyl elastomers (BIIR).

BACKGROUND OF THE INVENTION

It is known that reinforcing fillers such as carbon black and silica greatly improve the strength and fatigue properties of elastomeric compounds. It is also known that chemical interaction occurs between the elastomer and the filler. For example, good interaction between carbon black and highly unsaturated elastomers such as polybutadiene (BR) and styrene butadiene copolymers (SBR) occurs because of the large number of carbon-carbon double bonds present in these copolymers. Butyl elastomers may have only one tenth, or fewer, of the carbon-carbon double bonds found in BR or SBR, and compounds made from butyl elastomers are known to interact poorly with carbon black. For example, a compound prepared by mixing carbon black with a combination of BR and butyl elastomers results in domains of BR, which contain most of the carbon black, and butyl domains which contain very little carbon black. It is also known that butyl compounds have poor abrasion resistance.

Canadian Patent Application 2,293,149 teaches that it is possible to produce filled butyl elastomer compositions with much improved properties by combining halobutyl elastomers with silica and specific silanes. These silanes act as dispersing and bonding agents between the halogenated butyl elastomer and the filler. However, one disadvantage of the use of silanes is the evolution of alcohol during the manufacturing process and potentially during the use of the manufactured article produced by this process. Additionally, silanes significantly increase the cost of the resulting manufactured article.

Co-pending Canadian Patent Application 2,339,080 discloses filled halobutyl elastomeric compounds containing certain organic compounds containing at least one basic nitrogen-containing group and at least one hydroxyl group enhance the interaction of halobutyl elastomers with carbon-black and mineral fillers, resulting in improved compound properties such as tensile strength and abrasion (DIN).

Co-pending Canadian Application CA-2,368,363 discloses filled halobutyl elastomer compositions containing halobutyl elastomers, at least one mineral filler in the presence of organic compounds containing at least one basic nitrogen-containing group and at least one hydroxyl group and at least one silazane compound. However, said the CA 2,368,363 does not teach or suggest mineral fillers which are pre-modified with organic compounds containing at least one basic nitrogen-containing group and at least one hydroxyl group and silazane compounds.

SUMMARY OF THE INVENTION

The present invention provides a process for preparing compositions containing halobutyl elastomers and at least one mineral filler that has been reacted with at least one organic compound containing at least one basic nitrogen-containing group and at least one hydroxyl group and optionally at least one silazane compound before admixing the (pre-reacted) filler with the halobutyl elastomer. The present invention also provides a means to produce such filled compositions without the evolution of alcohol, and at significantly reduced costs, compared to processes known in the art.

It has been discovered that the interaction of halobutyl elastomers with the pre-reacted filler(s) is improved, resulting in improved compound properties such as tensile strength and abrasion resistance (DIN). Compounds of this type are believed to aid in the dispersion and linking of the silica to the halogenated elastomer.

Accordingly, the present invention also provides a process which includes mixing a halobutyl elastomer with at least one mineral filler that has been reacted with at least one organic compound containing at least one basic nitrogen-containing group and at least one hydroxyl group and optionally with at least one silazane compound before admixing the (pre-reacted) filler with the halobutyl elastomer and curing the resulting filled halobutyl elastomer.

DETAILED DESCRIPTION OF THE INVENTION

Figure 1:
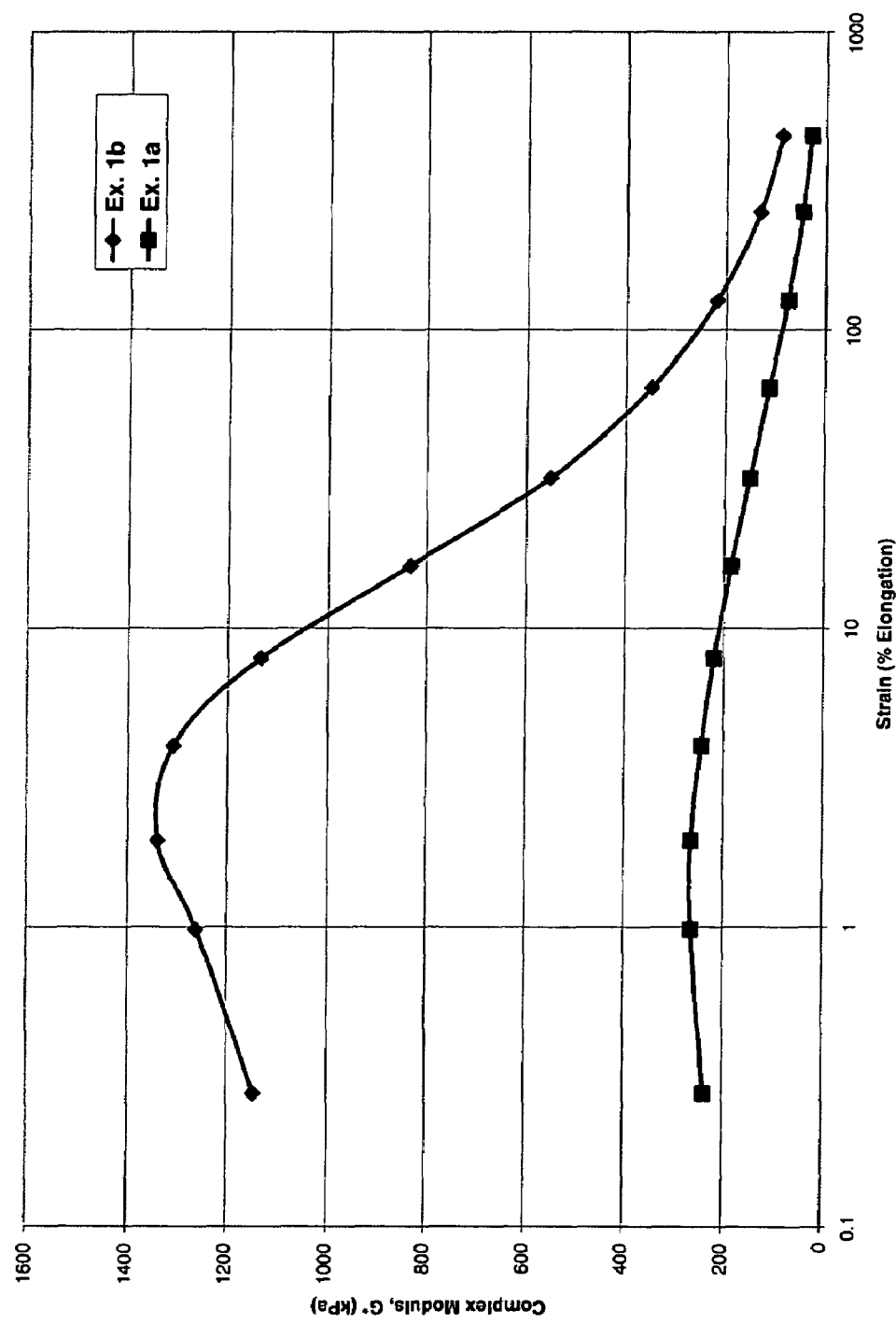
FIG. 1 illustrates the RPA Analysis of a compound prepared with HMDZ functionalized silica and a compound prepared with nonfunctionalized silica.

The halobutyl elastomer that is admixed with the pre-reacted mineral filler (i.e. the filler that has been reacted with at least one organic compound containing at least one basic nitrogen-containing group and at least one hydroxyl group and optionally with at least one silazane compound) may be a mixture with another elastomer or elastomeric compound. The halobutyl elastomer should constitute more than 5% of any such mixture. Preferably the halobutyl elastomer should constitute at least 10% of any such mixture. More preferably the halobutyl elastomer constitutes at least 50% of any such mixture. In most cases it is preferred not to use mixtures but to use the halobutyl elastomer as the sole elastomer. If mixtures are to be used, however, then the other elastomer may be, for example, natural rubber, polybutadiene, styrene-butadiene or poly-chloroprene or an elastomer compound containing one or more of these elastomers.

The filled halobutyl elastomer can be cured to obtain a product which has improved properties, for instance in abrasion resistance, rolling resistance and traction. Curing can be effected with sulfur. The preferred amount of sulfur is in the range of from 0.3 to 2.0 parts by weight per hundred parts of rubber. An activator, for example zinc oxide, may also be used, in an amount in the range of from 0.5 parts to 2 parts by weight. Other ingredients, for instance stearic acid, antioxidants, or accelerators may also be added to the elastomer prior to curing. Sulphur curing is then effected in the known manner. See, for instance, chapter 2, "The Compounding and Vulcanization of Rubber", of "Rubber Technology", $3^{rd}$ edition, published by Chapman & Hall, 1995, the disclosure of which is incorporated by reference with regard to jurisdictions allowing for this procedure.

Other curatives known to cure halobutyl elastomers may also be used. A number of compounds are known to cure halobutyl elastomers, for example, bis dieneophiles (for example m-phenyl-bis-maleamide, HVA2), phenolic resins, amines, amino-acids, peroxides, zinc oxide and the like. Combinations of the aforementioned curatives may also be used.

The mineral-filled halobutyl elastomer of the present invention may be admixed with other elastomers or elastomeric compounds before it is subjected to curing with sulphur.

The phrase "halobutyl elastomer(s)" as used herein refers to a chlorinated and/or brominated butyl elastomer. Brominated butyl elastomers are preferred, and the invention is illustrated, by way of example, with reference to such bromobutyl elastomers. It should be understood, however, that the invention particularly extends to the use of chlorinated butyl elastomers.

Brominated butyl elastomers may be obtained by bromination of butyl rubber (which is a copolymer of an isoolefin, usually isobutylene and a co-monomer that is usually a $C_4$ to $C_6$ conjugated diolefin, preferably isoprene-(brominated isobutene-isoprene-copolymers BIIR)). Comonomers other than conjugated diolefins can be used, however, and mention is made of alkyl-substituted vinyl aromatic co-monomers such as $C_1$-$C_4$-alkyl substituted styrene(s). An example of such an elastomer which is commercially available is brominated isobutylene methylstyrene copolymer (BIMS) in which the co-monomer is p-methylstyrene.

Brominated butyl elastomers typically contain in the range of from 0.1 to 10 weight percent of repeating units derived from diolefin (preferably isoprene) and in the range of from 90 to 99.9 weight percent of repeating units derived from isoolefin (preferably isobutylene) (based upon the hydrocarbon content of the polymer) and in the range of from 0.1 to 9 weight percent bromine (based upon the bromobutyl polymer). A typical bromobutyl polymer has a molecular weight, expressed as the Mooney viscosity according to DIN 53 523 (ML 1+8 at 125° C.), in the range of from 25 to 60.

For use in the present invention the brominated butyl elastomer preferably contains in the range of from 0.5 to 5 weight percent of repeating units derived from isoprene (based upon the hydrocarbon content of the polymer) and in the range of from 95 to 99.5 weight percent of repeating units derived from isobutylene (based upon the hydrocarbon content of the polymer) and in the range of from 0.2 to 3 weight percent, preferably from 0.75 to 2.3 weight percent, of bromine (based upon the brominated butyl polymer).

A stabilizer may be added to the brominated butyl elastomer. Suitable stabilizers include calcium stearate and hindered phenols, preferably used in an amount in the range of from 0.5 to 5 parts by weight per 100 parts by weight of the brominated butyl rubber (phr).

Examples of suitable brominated butyl elastomers include Bayer Bromobutyl® 2030, Bayer Bromobutyl® 2040 (BB2040), and Bayer Bromobutyl® X2 commercially available from Bayer. Bayer BB2040 has a Mooney viscosity (ML 1+8@125° C.) of 39±4, a bromine content of 2.0±0.3 wt % and an approximate weight average molecular weight of 500,000 grams per mole.

The brominated butyl elastomer used in the process of the present invention may also be a graft copolymer of a brominated butyl rubber and a polymer based upon a conjugated diolefin monomer. Co-pending Canadian Patent Application 2,279,085 is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The disclosure of this application is incorporated herein by reference with regard to jurisdictions allowing for this procedure. The bromobutyl elastomer of the graft copolymer can be any of those described above. The conjugated diolefins that can be incorporated in the graft copolymer generally have the structural formula:

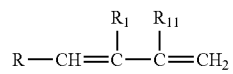

wherein R is a hydrogen atom or an alkyl group containing from 1 to 8 carbon atoms and wherein $R_1$ and $R_{11}$ can be the same or different and are selected from hydrogen atoms and alkyl groups containing from 1 to 4 carbon atoms. Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing from 4 to 8 carbon atoms are preferred, 1,3-butadiene and isoprene are more preferred.

The polymer based on a conjugated diene monomer can be a homopolymer, or a copolymer of two or more conjugated diene monomers, or a copolymer with a vinyl aromatic monomer.

The vinyl aromatic monomers which can optionally be used are selected so as to be copolymerizable with the conjugated diolefin monomers being employed. Generally, any vinyl aromatic monomer which is known to polymerize with organo-alkali metal initiators can be used. Such vinyl aromatic monomers usually contain in the range of from 8 to 20 carbon atoms, preferably from 8 to 14 carbon atoms. Some examples of vinyl aromatic monomers which can be so copolymerized include styrene, alpha-methyl styrene, various alkyl styrenes including p-methylstyrene, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene.

The halogenated butyl elastomer may be used alone or in combination with other elastomers such as:
  BR—polybutadiene
  ABR—butadiene/$C_1$-$C_4$ alkyl acrylate copolymers
  CR—polychloroprene
  IR—polyisoprene
  SBR—styrene/butadiene copolymers with styrene contents of 1 to 60, preferably 20 to 50 wt. %
  IIR—isobutylene/isoprene copolymers
  NBR—butadiene/acrylonitrile copolymers with acrylonitrile contents of 5 to 60, preferably 10 to 40 wt. %

HNBR—partially hydrogenated or completely hydrogenated NBR

EPDM—ethylene/propylene/diene copolymers.

The filler is composed of particles of a mineral, and examples include silica, silicates, clay (such as bentonite), gypsum, alumina, titanium dioxide, talc and the like, as well as mixtures thereof.

Further examples are:

highly dispersable silicas, prepared e.g. by the precipitation of silicate solutions or the flame hydrolysis of silicon halides, with specific surface areas of 5 to 1000, preferably 20 to 400 m$^2$/g (BET specific surface area), and with primary particle sizes of 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicates;

magnesium silicate or calcium silicate, with BET specific surface areas of 20 to 400 m$^2$/g and primary particle diameters of 10 to 400 nm;

natural silicates, such as kaolin and other naturally occurring silica;

glass fibres and glass fibre products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide;

or combinations thereof.

Some mineral particles have hydroxyl groups on their surface, rendering them hydrophilic and oleophobic. This exacerbates the difficulty of achieving good interaction between the filler particles and the butyl elastomer. For many purposes, the preferred mineral is silica, especially silica prepared by the carbon dioxide precipitation of sodium silicate.

Dried amorphous silica particles suitable for use in accordance with the present invention have a mean agglomerate particle size in the range of from 1 to 100 microns, preferably between 10 and 50 microns and more preferably between 10 and 25 microns. It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are available under the trademarks HiSil® 210, HiSil® 233 and HiSil® 243 from PPG Industries Inc. Also suitable are Vulkasil S and Vulkasil N, from Bayer AG (Vulkasil is a registered trademark of Bayer AG).

Those mineral filler may be used in combination with known non-mineral fillers, such as carbon blacks; the carbon blacks to be used here are prepared by the lamp black, furnace black or gas black process and have BET specific surface areas of 20 to 200 m$^2$/g, e.g. SAF, ISAF, HAF, FEF or GPF carbon blacks; or rubber gels, especially those based on polybutadiene, butadiene/styrene copolymers, butadiene/acrylonitrile copolymers and polychloroprene.

Non-mineral fillers are not normally used as filler in the halobutyl elastomer compositions of the present invention, they may be present in an amount up to 40 phr. In these cases, it is preferred that the mineral filler should constitute at least 55% by weight of the total amount of filler. If the halobutyl elastomer composition of the present invention is blended with another elastomeric composition, that other composition may contain mineral and/or non-mineral fillers.

The silazane compound can have one or more silazane groups, e.g. disilazanes. Organic silazane compounds are preferred. Examples include but are not limited to Hexamethyldisilazane (HDMZ), Heptamethyldisilazane, 1,1,3,3-Tetramethyldisilazane, 1,3-bis(Chloromethyl)-tetramethyldisilazane, 1,3-Divinyl-1,1,3,3-tetramethyldisilazane, and 1,3-Diphenyltetramethyldisilazane.

The organic compound containing at least one basic nitrogen-containing group and at least one hydroxyl group is not limited to a special class of compounds. Examples include proteins, aspartic acid, 6-aminocaproic acid, and other compounds comprising an amino and an alcohol function, such as diethanolamine and triethanolamine. Preferably, the organic compound containing at least one basic nitrogen-containing group and at least one hydroxyl group comprises a primary alcohol group and an amine group separated by methylene bridges, the methylene bridges may be branched. Such compounds have the general formula HO—A—NH$_2$; wherein A represents a C$_1$ to C$_{20}$ alkylene group, which may be linear or branched.

More preferably, the number of methylene groups between the two functional groups should be in the range of from 1 to 4. Examples of preferred additives include monoethanolamine and N,N-dimethyamino-ethanol (DMAE).

The amount of pre-reacted filler to be incorporated into the halobutyl elastomer can vary between wide limits. Typical amounts of the filler range from 20 parts to 250 parts by weight, preferably from 30 parts to 100 parts, more preferably from 40 to 80 parts per hundred parts of elastomer. In cases where a silazane compound is present, the amount of the silazane compound contained in the filler is typically in the range of from 0.3 to 10 parts per hundred parts of elastomer, preferably of from 0.5 to 6, more preferably of from 1 to 5 parts per hundred parts of elastomer. The amount of hydroxyl- and amine-containing compound contained in the filler is typically in the range of from 0.5 to 10 parts per hundred parts of elastomer, preferably of from 1 to 3 parts per hundred parts of elastomer. The mineral filler is reacted with at least one organic compound containing at least one basic nitrogen-containing group and at least one hydroxyl group and optionally at least one silazane compound before admixing the resulting pre-reacted filler with the elastomer(s). The reaction between filler and the organic compound(s) containing at least one basic nitrogen-containing group and at least one hydroxyl group and optionally the silazane compound(s) (filler derivatization reaction) is effected by suspending the mineral filler (e.g. a silica such as HiSil® 233) in organic diluents (e.g. hexane) with rapid agitation. Once a stable suspension is obtained, the appropriate levels of the organic compound(s) containing at least one basic nitrogen-containing group and at least one hydroxyl group and optionally silazane compound(s) and/or optionally further additives is added. After completion of the reaction (preferably after 8 hours), the pre-reacted filler is separated from the organic phase and dried (optionally in vacuum to a constant weight).

Furthermore up to 40 parts of processing oil, preferably from 5 to 20 parts, per hundred parts of elastomer, may be present in the final mixture comprising pre-reacted filler and elastomer(s). Further, a lubricant, for example a fatty acid such as stearic acid, may be present in an amount up to 3 parts by weight, more preferably in an amount up to 2 parts by weight.

The halobutyl elastomer(s), pre-reacted filler(s) and optionally other filler(s) are mixed together, suitably at a temperature in the range of from 25 to 200° C. It is preferred that the temperature in one of the mixing stages be greater than 60° C., and a temperature in the range of from 90 to 150° C. is more preferred. Normally the mixing time does not exceed one hour; a time in the range from 2 to 30 minutes is usually adequate. The mixing is suitably carried out on a two-roll mill mixer, which provides good dispersion of the filler within the elastomer. Mixing may also be carried out in a Banbury mixer, or in a Haake or Brabender miniature internal mixer. An extruder also provides good mixing, and has the further advantage that it permits shorter mixing times. It is also possible to carry out the mixing in two or more stages. Further, the mixing can be carried out in different apparatuses, for example one stage may be carried out in an internal mixer and another in an extruder.

The enhanced interaction between the filler and the halobutyl elastomer results in improved properties for the filled elastomer. These improved properties include higher tensile strength, higher abrasion resistance, lower permeability and better dynamic properties. These render the filled elastomers suitable for a number of applications, including, but not limited to, use in tire treads and tire sidewalls, tire innerliners, tank linings, hoses, rollers, conveyor belts, curing bladders, gas masks, pharmaceutical enclosures and gaskets.

According to the present invention, bromobutyl elastomer, pre-reacted silica particles and optionally, processing oil extender can be mixed on a two-roll mill at a nominal mill temperature of 25° C. The mixed compound can then placed on a two-roll mill and mixed at a temperature above 60° C. It is preferred that the temperature of the mixing is not too high, and more preferably does not exceed 150° C., since higher temperatures may cause curing to proceed undesirably far and thus impede subsequent processing. The product of mixing these four ingredients at a temperature not exceeding 150° C. is a compound which has good stress/strain properties and which can be readily processed further on a warm mill with the addition of curatives.

The filled halobutyl rubber compositions of the present invention, such as filled bromobutyl rubber compositions, find many uses, but mention is made particularly of use in tire tread compositions.

The invention is further illustrated in the following examples.

EXAMPLES

Description of Tests

Abrasion Resistance:

DIN 53-516 (60 grit Emery paper)

Dynamic Property Testing:

RPA measurements were obtained with the use of an Alpha Technologies RPA 2000 operating at 100° C. at a frequency of 6 cpm. Strain sweeps were measured at strains of 0.1, 0.2, 0.5, 1, 2, 5, 10, 20, 50 and 90°. Stress-strain samples were prepared by curing a macro sheet at 170° C. for tc90+5 minutes, after which the appropriate sample was dyed out. The test was conducted at 70° C.

Cure Rheometry.

ASTM D 52-89 MDR2000E Rheometer at 1° arc and 1.7 Hz

Description of Ingredients and General Mixing Procedure:

Hi-Sil® 233—silica—a product of PPG

Sunpar® 2280—paraffinic oil produced by Sun Oil

Maglite® D—magnesium oxide produced by CP Hall.

The brominated butyl elastomer (in all cases commercial Bayer® Bromobutyl 2030) silica, oil and pre-reacted filler were mixed on either:

i) a tangential Banbury internal mixer operating at 77 rpm while being thermally regulated with the use of a Mokon set to 40° C. Compounds were mixed for a total of 6 minutes. The final rubber temperature ranged from 140° C. to 180° C.

ii) a 100"×20" two-roll mill with the rolls running at 24 and 32 rpm. The mill roll was set at 25° C., with a total incorporation time of 10 minutes. The mixed compounds were then "heat treated" for a further 10 minutes with the roll temperature at 110° C. The final rubber temperature was 125° C.

Curatives were then added to the cooled sample with the mill at 25° C.

Examples 1a and 1b (Comparative)

The following examples illustrates the use of HMDZ functionalized silica in a Bromobutyl compound (1a) in comparison to use of non-functionalized silica in a Bromobutyl compound (1b). The functionalized silica was prepared by suspending HiSil® 233 in hexanes with rapid agitation. Once a stable suspension was obtained, the specified amount of HMDZ was added with the use of a disposable syringe. The functionalization reaction was allowed to proceed, under agitation, for 8 hours. At this point, the silica was separated from the organic phase and dried, at 60° C., to a constant weight. The Bromobutyl compounds (1a) and (1b) subsequently prepared with functionalized (1a) and non-fuctionalized (1b) silica were mixed with the use of a 10"×20" mill. The compounding procedure involved mixing the Bromobutyl (BB2030) with the silica on a 10"×20" mill at room temperature. Once the silica was incorporated into the BB2030, the compounds were heat treated on the mill at a temperature of 110° C. The curatives (sulfur, stearic acid and zinc oxide) were subsequently added at room temperature with the use of a 10"×20" mill. The details associated with the preparation of the silica and subsequent Bromobutyl compound can be found in Table 1.

The physical properties of the resulting compounds are presented in Table 2. As can be seen from this data, the use of HMDZ functionalized silica (1a) significantly decreases the DIN abrasion volume loss of this compound compared to the control compound (1b) which was prepared in an analogous manner, but with the use of unmodified HiSil 233. Interestingly, the compound prepared with HMDZ functionalized silica was found to possess a longer t03 time (indication of Mooney scorch, the larger the t03 time the better the scorch safety) than that found for the control compound.

Figure 2:
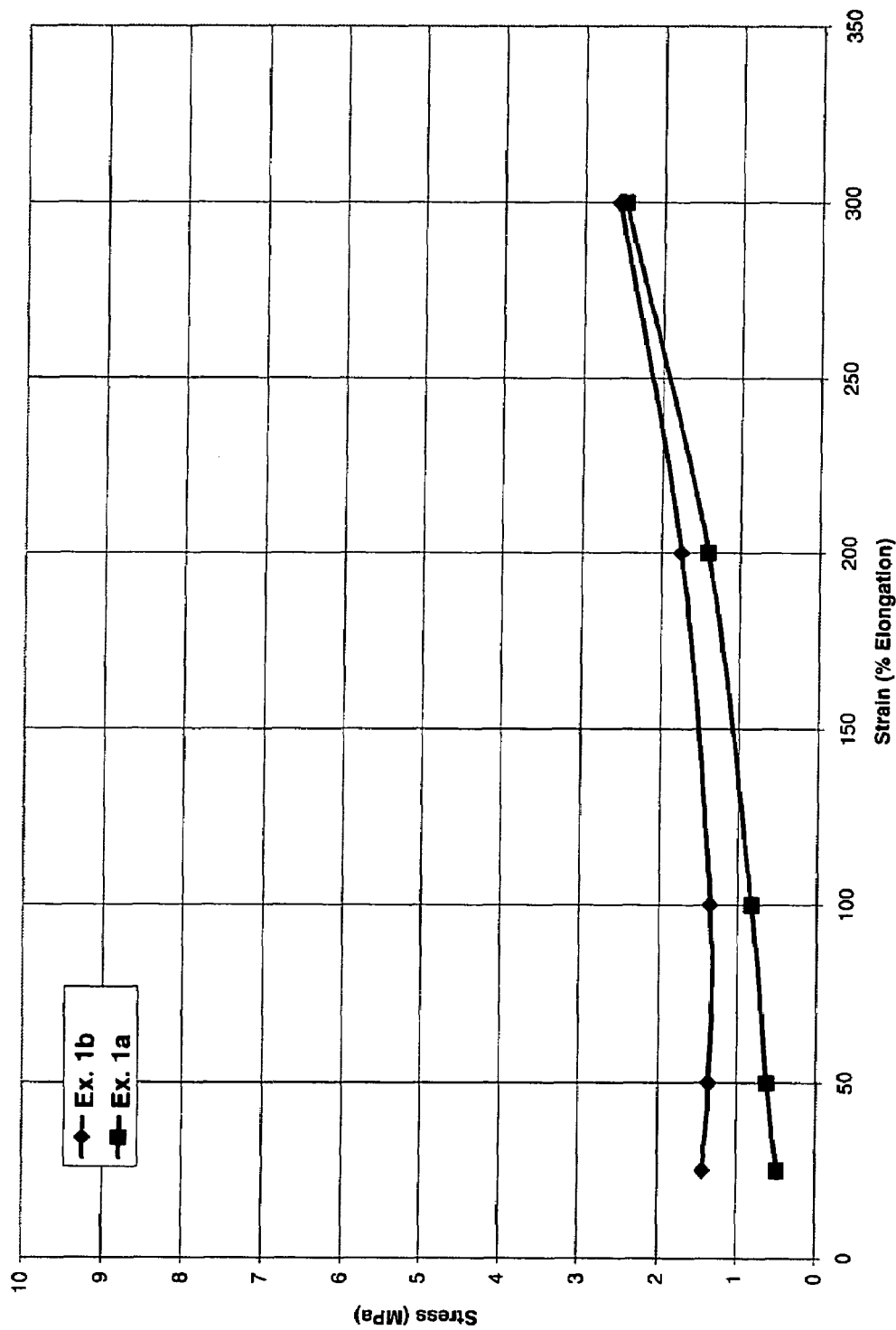
FIG. 2 illustrates the stress strain profile of a compound prepared with HMDZ functionalized silica and a compound prepared with nonfunctionalized silica.

RPA Analysis (FIG. 1) of the compound prepared with HMDZ functionalized silica revealed a significant improvement in filler distribution as evidenced by the lower value of G* at low strains as compared to the control compound based on unmodified HiSil 233. The stress-strain profile (FIG. 2) revealed little difference between this compound and the control.

Examples 2a (According to the Invention) and 2b (Comparative)

The following examples illustrates the use of DMAE functionalized silica in a Bromobutyl compound (2a) in comparison to use of non-functionalized silica in a Bromobutyl compound (2b). The functionalized silica was prepared by suspending HiSil® 233 in hexanes with rapid agitation. Once a stable suspension was obtained, the specified amount of DMAE was added with the use of a disposable syringe. The functionalization reaction was allowed to proceed, under agitation, for 8 hours. At this point, the silica was separated from the organic phase and dried, at 60° C., to a constant weight. The Bromobutyl compounds subsequently prepared with functionalized silica (2a) and non-functionalized silica (2b) were mixed with the use of a 10"×20" mill. The compounding procedure involved mixing the Bromobutyl (BB2030) with the silica on a 10"×20" mill at room temperature. Once the silica was incorporated into the BB2030, the compounds were heat treated on the mill at a temperature of 110° C. The curatives (sulfur, stearic acid and zinc oxide) were subsequently added at room temperature with the use of a 10"×20" mill. The details associated with the preparation of the silica and subsequent Bromobutyl compounds can be found in Table 3.

The physical properties of the resulting compounds are presented in Table 4. As can be seen from this data, the use of DMAE functionalized silica significantly decreases the DIN abrasion volume loss of this compound compared to the control compound which was prepared in an analogous manner, but with the use of unmodified HiSil 233 and compound 1a. The compound prepared with DMAE functionalized silica was found to possess a t03 time only slightly lower than that found for the control compound. This t03 time is, however, significantly longer than that observed for compounds in which DMAE is added to a mixture of BB2030 and HiSil 233 via conventional mixing approaches (see Co-pending Canadian Patent Application 2,339,080).

Figure 3:
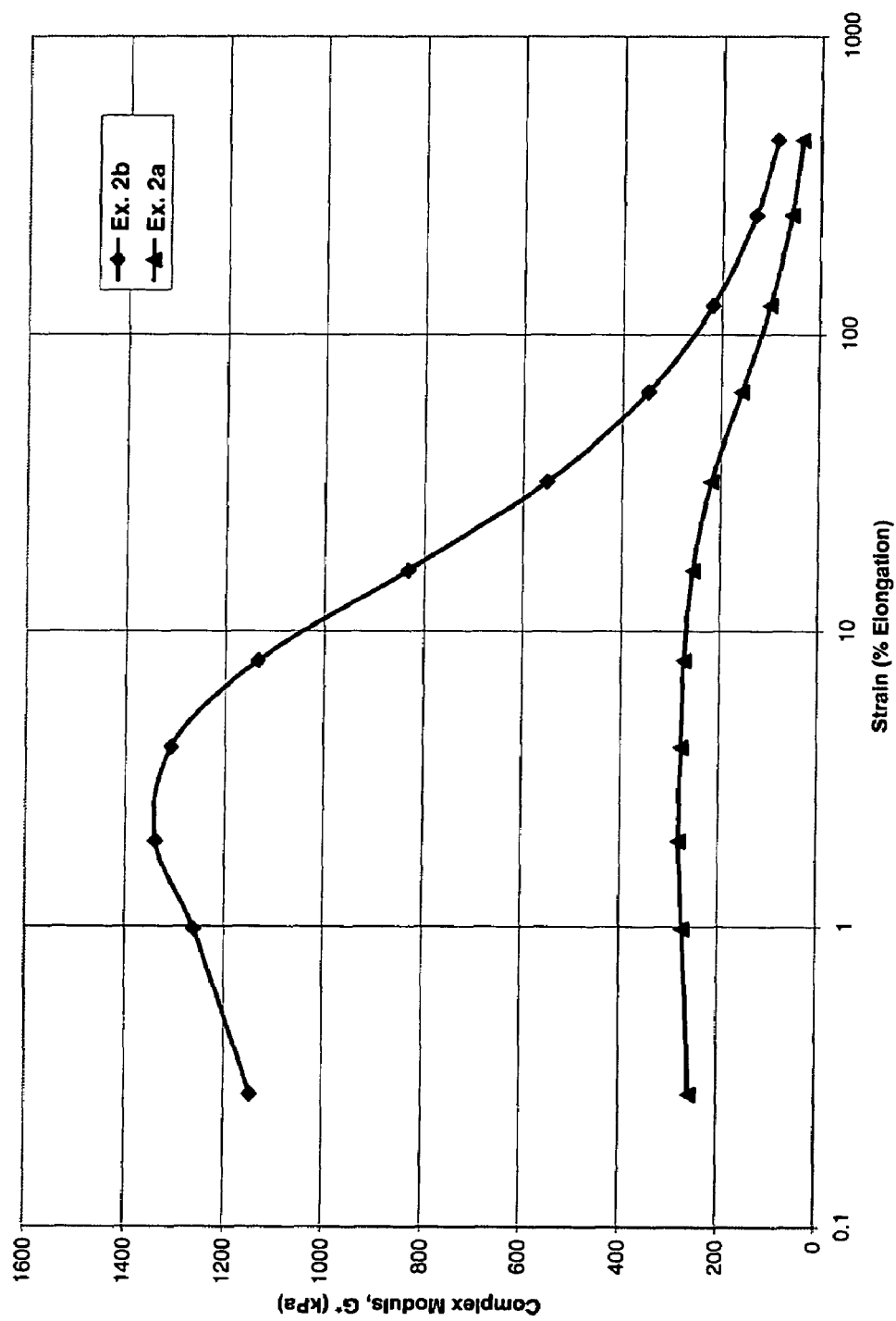
FIG. 3 illustrates the RPA Analysis of a compound prepared with DMAE functionalized silica and a compound prepared with nonfunctionalized silica.
Figure 4:
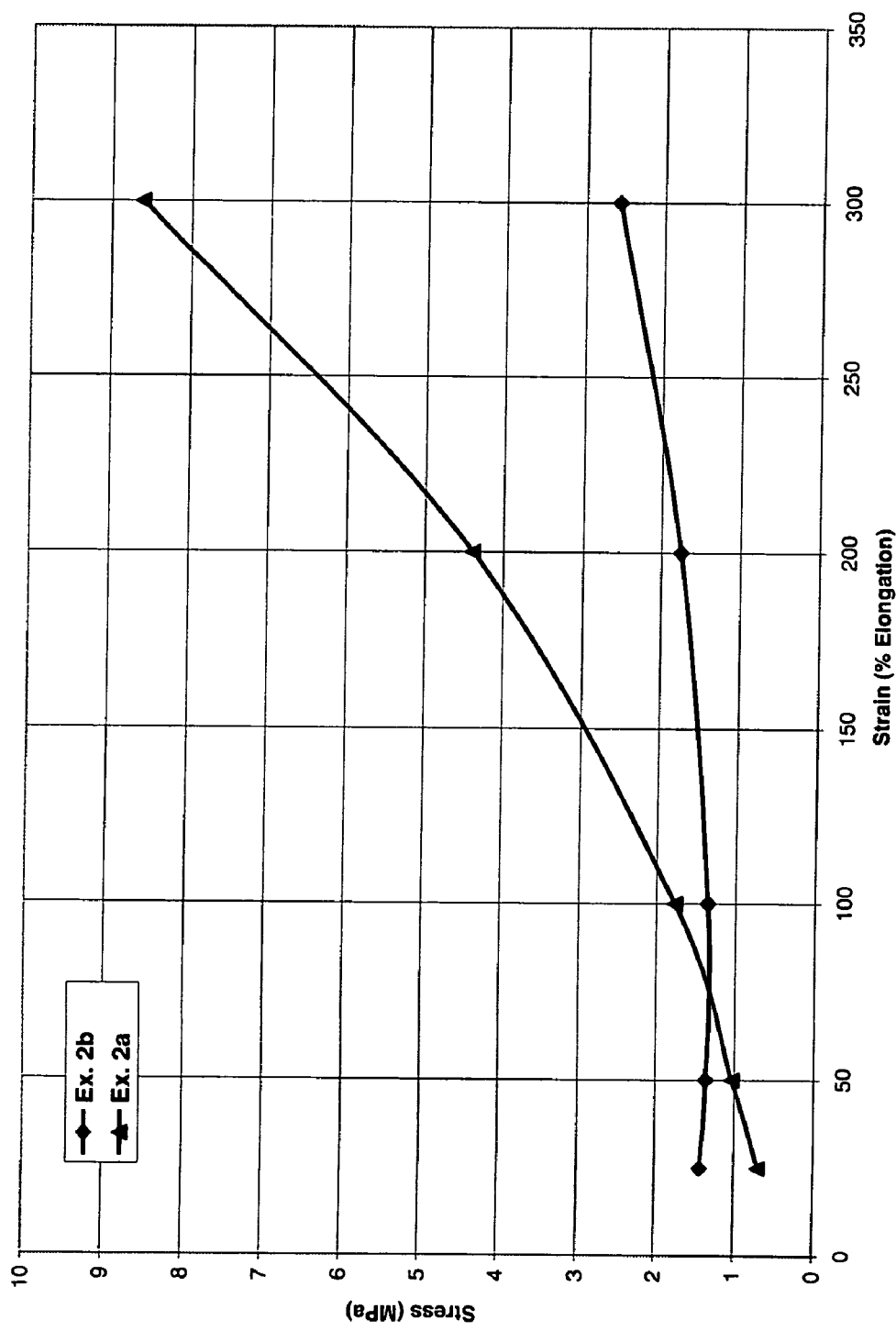
FIG. 4 illustrates the stress strain profile of a compound prepared with DMAE functionalized silica and a compound prepared with nonfunctionalized silica.

RPA Analysis (FIG. 3) of the compound prepared with DMAE functionalized silica revealed a significant improvement in filler distribution as evidenced by the lower value of G* at low strains as compared to the control compound based on unmodified HiSil 233. The stress-strain profile (FIG. 4) revealed a substantial improvement in the degree of re-inforcement when compared to that observed for the control compound.

Examples 3a (According to the Invention) and 3b (Comparative)

The following examples illustrate the use of HMDZ/DMAE functionalized silica (at levels which correspond to 1.45 phr of HMDZ and 2.8 phr of DMAE as found in the final bromobutyl compound) in a Bromobutyl compound (3a) in comparison to use of non-functionalized silica in a Bromobutyl compound (3b). The functionalized silica was prepared by suspending HiSil 233 in hexanes with rapid agitation. Once a stable suspension was obtained, the specified amount of HMDZ and DMAE was added with the use of a disposable syringe. The functionalization reaction was allowed to proceed, under agitation, for 8 hours. At this point, the silica was separated from the organic phase and dried, at 60° C., to a constant weight. The Bromobutyl compounds subsequently prepared with functionalized silica (3a) and non-functionalized silica (3b) were mixed with the use of a 10"×20" mill. The compounding procedures involved mixing the Bromobutyl (BB2030) with the silica on a 10"×20" mill at room temperature. Once the silica was incorporated into the BB2030, the compounds were heat treated on the mill at a temperature of 110° C. The curatives (sulfur, stearic acid and zinc oxide) were subsequently added at room temperature with the use of a 10"×20" mill. The details associated with the preparation of the silica and subsequent Bromobutyl compounds can be found in Table 5.

The physical properties of the resulting compounds are presented in Table 6. As can be seen from this data, the use of HMDZ/DMAE functionalized silica significantly decreases the DIN abrasion volume loss of this compound compared to the control compound which was prepared in an analogous manner, but with the use of unmodified HiSil 233 and compound 1a and 2a. Importantly, the compound prepared with HMDZ/DMAE functionalized silica was found to possess a longer t03 time when compared to that found for the control compound. As in the previous example, this t03 time is significantly longer than that observed for compounds in which HMDZ and DMAE are added to a mixture of BB2030 and HiSil 233 via conventional mixing approaches (see Co-pending Canadian Patent Application 2,339,080).

Figure 5:
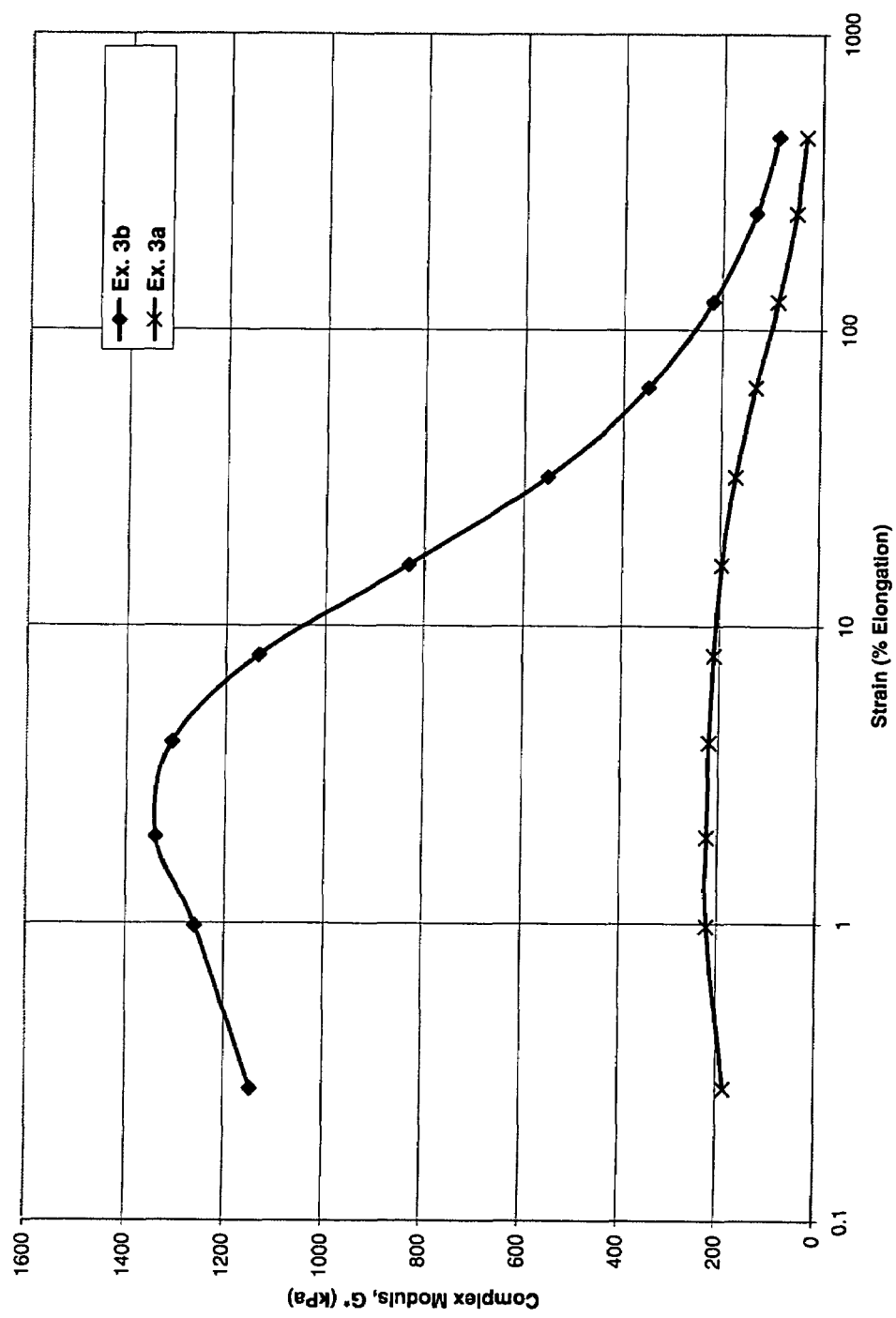
FIG. 5 illustrates the RPA Analysis of a compound prepared with HMDZ/DMAE functionalized silica and a compound prepared with nonfunctionalized silica.
Figure 6:
FIG. 6 illustrates the stress strain profile of a compound prepared with HMDZ/DMAE functionalized silica and a compound prepared with nonfunctionalized silica.

RPA Analysis (FIG. 5) of the compound prepared with HMDZ/DMAE functionalized silica revealed a significant improvement in filler distribution as evidenced by the lower value of G* at low strains as compared to the control compound based on unmodified HiSil 233. Importantly, the degree of filler distribution appears to be enhanced with silica which has been modified with both HMDZ and DMAE (c.f. Example 1 and Example 2). The stress-strain profile (FIG. 6) revealed a substantial improvement in the degree of reinforcement when compared to that observed for the control compound.

Example 4a (According to the Invention) and 4b (Comparative)

The following examples illustrate the use of HMDZ/DMAE functionalized silica (at levels which correspond to 1.45 phr of HMDZ and 3.0 phr of DMAE as found in the final bromobutyl compound) in a Bromobutyl compound (4a) in comparison to use of non-functionalized silica in a Bromobutyl compound (4b). The functionalized silica was prepared by suspending HiSil 233 in hexanes with rapid agitation. Once a stable suspension was obtained, the specified amount of HMDZ and DMAE was added with the use of a disposable syringe. The functionalization reaction was allowed to proceed, under agitation, for 8 hours. At this point, the silica was separated from the organic phase and dried, at 60° C., to a constant weight. The Bromobutyl compounds subsequently prepared with functionalized silica (4a) and non-functionalized silica (4b) were mixed with the use of a 10"×20" mill. The compounding procedure involved mixing the Bromobutyl (BB2030) with the silica on a 10"×20" mill at room temperature. Once the silica was incorporated into the BB2030, the compounds were heat treated on the mill at a temperature of 110° C. The curatives (sulfur, stearic acid and zinc oxide) were subsequently added at room temperature with the use of a 10"×20" mill. The details associated with the preparation of the silica and subsequent Bromobutyl compounds can be found in Table 7.

The physical properties of the resulting compounds are presented in Table 8. As can be seen from this data, the use of HMDZ/DMAE functionalized silica significantly decreases the DIN abrasion volume loss of this compound compared to the control compound which was prepared in an analogous manner, but with the use of unmodified HiSil 233 and compounds 1a and 2a. Importantly, the compound prepared with HMDZ/DMAE functionalized silica was found to possess a longer t03 time when compared to that found for the control compound. As in the previous example, this t03 time is significantly longer than that observed for compounds in which HMDZ and DMAE are added to a mixture of BB2030 and HiSil 233 via conventional mixing approaches (see Co-pending Canadian Patent Application 2,339,080).

Figure 7:
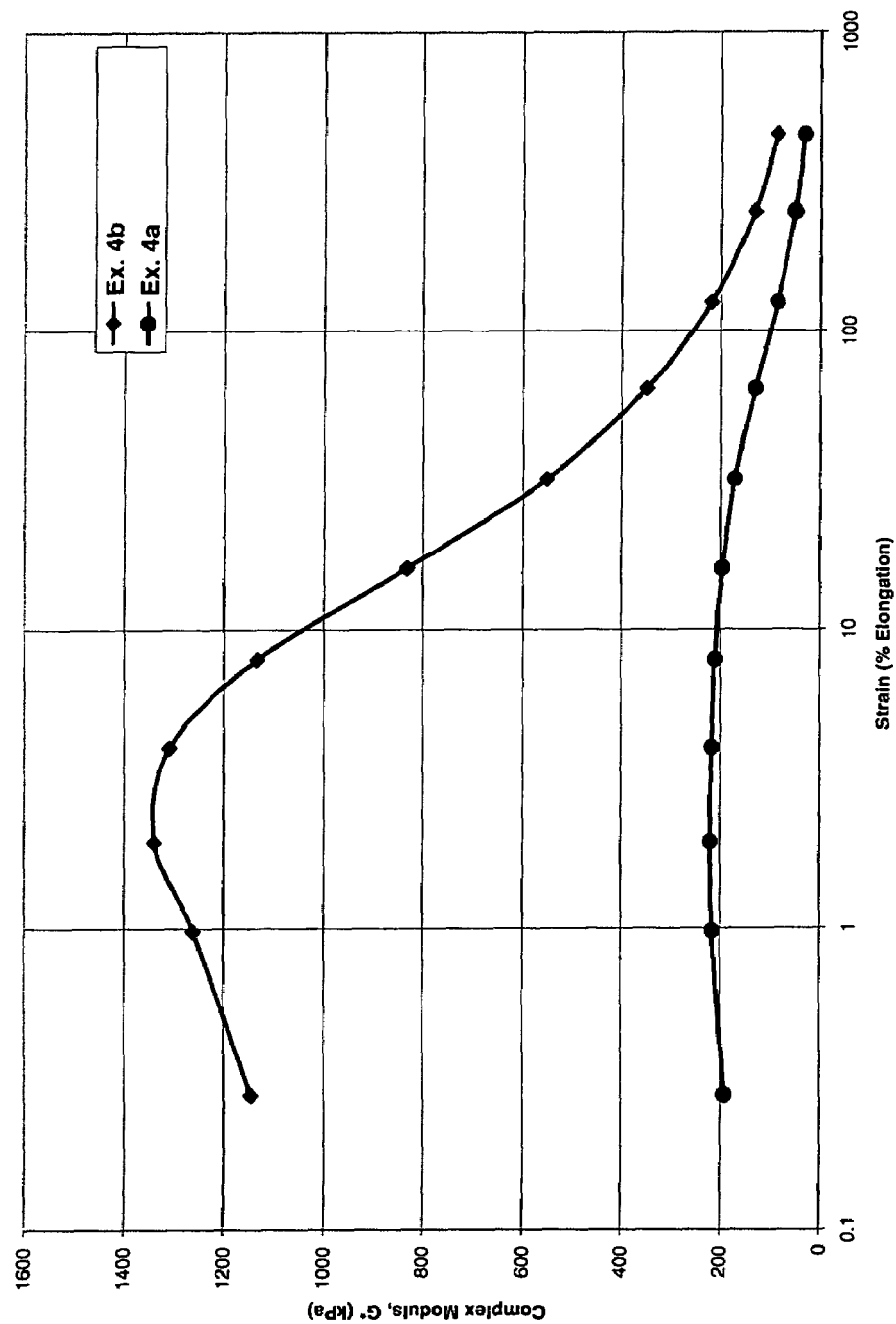
FIG. 7 illustrates the RPA Analysis of a compound prepared with HMDZ/SAME functionalized silica and a compound prepared with nonfunctionalized silica.
Figure 8:
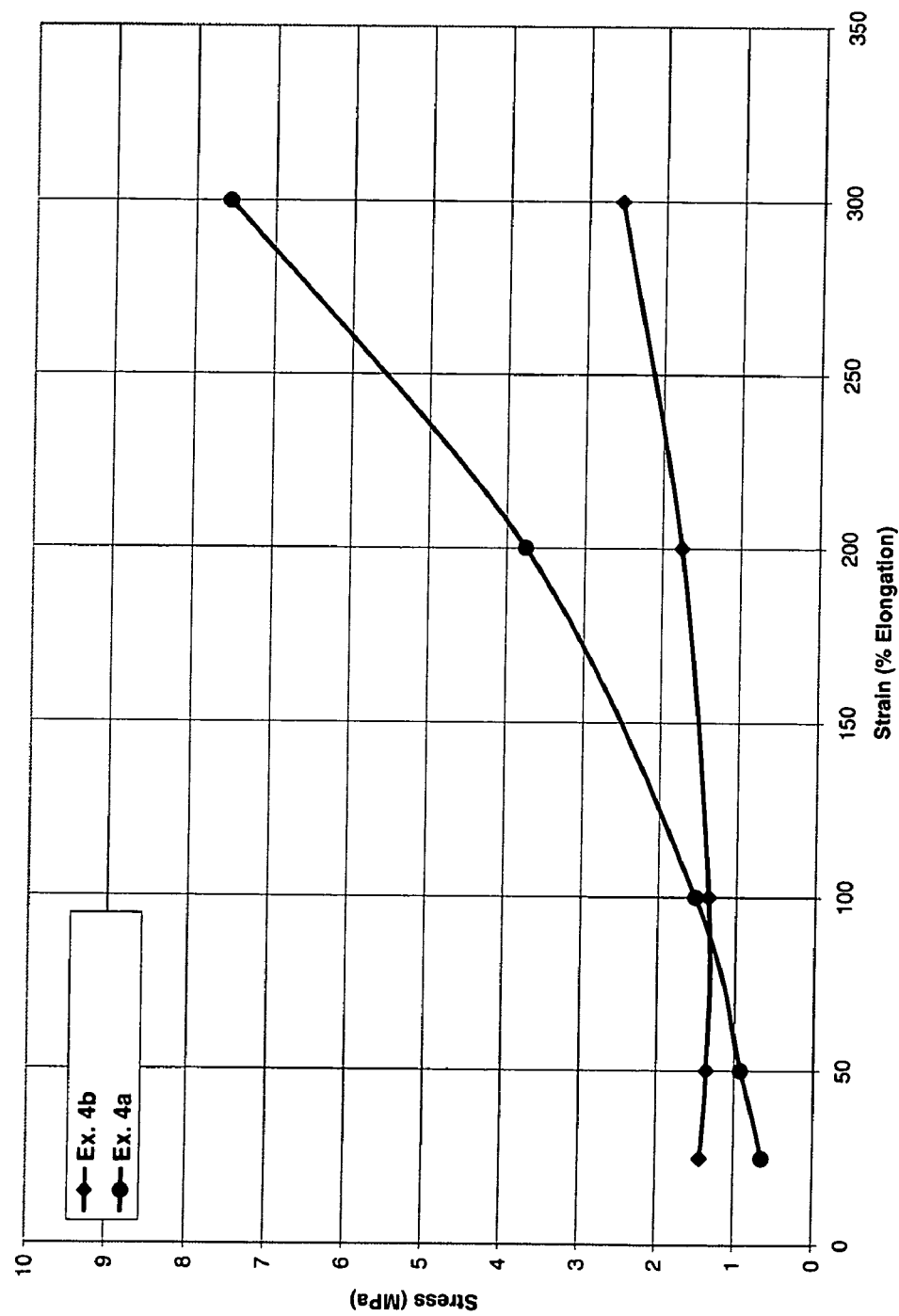
FIG. 8 illustrates the stress strain profile of a compound prepared with HMDZ/DMAE functionalized silica and a compound prepared with nonfunctionalized silica.

RPA Analysis (FIG. 7) of the compound prepared with DMAE functionalized silica revealed a significant improvement in filler distribution as evidenced by the lower value of G* at low strains as compared to the control compound based on unmodified HiSil 233. Importantly, the degree of filler distribution appears to be enhanced with silica which has been modified with both HMDZ and DMAE (c.f. Example 1 and Example 2). The stress-strain profile (FIG. 8) revealed a substantial improvement in the degree of re-inforcement when compared to that observed for the control compound.

The examples detailed above serve to illustrate the advantages of using pre-functionalized silica in Bromobutyl compounds. Compounds prepared with HMDZ functionalized silica were found to possess enhanced levels of filler dispersion, abrasion resistance (DIN) and scorch safety. However, the best results were obtained with compounds which were prepared with either DMAE or HMDZ/DMAE functionalized silica. Specifically, the best balance of properties were obtained with either DMAE or HMDZ/DMAE modified silica.

TABLE 1

Silica Preparation

| Silica Modifier | 2.9 HMDZ | None |
|---|---|---|
| Example | 1a | 1b |
| HiSil 233 (g) | 446.53 | 446.53 |
| Hexanes (mL) | 3000 mL | 3000 mL |
| DMAE (mL) | 0 | 0 |
| HMDZ (mL) | 28.21 | 0 |

Bromobutyl Compound

|  | PHR | PHR |
|---|---|---|
| BB2030 | 100 | 100 |
| Silica | 60 | 60 |
| Sulfur | 0.5 | 0.5 |
| Stearic Acid | 1 | 1 |
| ZnO | 1.5 | 1.5 |

TABLE 2

| | Example | |
|---|---|---|
| | 1b | 1a |
| STRESS STRAIN (DUMBELLS) | | |
| Silica Modifier | None | 2.9 HMDZ |
| Cure Time (min) | 43 | 24 |
| Cure Temperature (° C.) | 170 | 170 |
| Dumbell | Die C | Die C |
| Test Temperature (° C.) | 23 | 23 |
| Hardness Shore A2 (pts.) | 67 | 63 |
| Ultimate Tensile (MPa) | 7.56 | 16.14 |
| Ultimate Elongation (%) | 715 | 530 |
| Stress @ 25 (MPa) | 1.43 | 1.11 |
| Stress @ 50 (MPa) | 1.36 | 1.26 |
| Stress @ 100 (MPa) | 1.35 | 1.61 |
| Stress @ 200 (MPa) | 1.75 | 3.15 |
| Stress @ 300 (MPa) | 2.57 | 6.45 |
| DIN ABRASION | | |
| Abrasion Volume Loss (mm$^3$) | 418 | 225 |
| COMPOUND MOONEY SCORCH | | |
| Test Temperature (° C.) | 135 | 135 |
| t Value t03 (min) | 15.31 | >30 |
| t Value t18 (min) | >30 | >30 |
| MDR CURE CHARACTERISTICS | | |
| Frequency (Hz) | 1.7 | 1.7 |
| Test Temperature (° C.) | 170 | 170 |
| Degree Arc (°) | 1 | 1 |
| Test Duration (min) | 60 | 60 |
| Torque Range (dN · m) | 100 | 100 |
| Chart No. | 654 | 2077 |
| MH (dN · m) | 26.14 | 23.41 |
| ML (dN · m) | 13.8 | 5.49 |
| Delta MH – ML (dN · m) | 12.34 | 17.92 |
| ts 1 (min) | 0.3 | 0.9 |
| ts 2 (min) | 0.36 | 1.62 |
| t' 10 (min) | 0.27 | 1.42 |
| t' 25 (min) | 0.47 | 3.37 |
| t' 50 (min) | 4.14 | 6.52 |
| t' 90 (min) | 37.47 | 19.4 |
| t' 95 (min) | 48.01 | 24.33 |
| Delta t'50 – t'10 (min) | 3.87 | 5.1 |

TABLE 3

Silica Preparation

| Silica Modifier | 3.2 DMAE | None |
|---|---|---|
| Example | 2a | 2b |
| HiSil 233 (g) | 447.11 | 447.11 |
| Hexanes (mL) | 3000 mL | 3000 mL |
| DMAE (mL) | 26.88 | 0 |
| HMDZ (mL) | 0 | 0 |

Bromobutyl Compound

|  | PHR | PHR |
|---|---|---|
| BB2030 | 100 | 100 |
| Silica | 60 | 60 |
| Sulfur | 0.5 | 0.5 |
| Stearic Acid | 1 | 1 |
| ZnO | 1.5 | 1.5 |

TABLE 4

| | Example | |
|---|---|---|
| | 2b | 2a |
| STRESS STRAIN (DUMBELLS) | | |
| Silica Modifier | None | 3.2 DMAE |
| Cure Time (min) | 43 | 24 |
| Cure Temperature (° C.) | 170 | 170 |
| Dumbell | Die C | Die C |
| Test Temperature (° C.) | 23 | 23 |
| Hardness Shore A2 (pts.) | 67 | 53 |
| Ultimate Tensile (MPa) | 7.56 | 19.9 |
| Ultimate Elongation (%) | 715 | 440 |
| Stress @ 25 (MPa) | 1.43 | 0.911 |
| Stress @ 50 (MPa) | 1.36 | 1.26 |
| Stress @ 100 (MPa) | 1.35 | 2.13 |

TABLE 4-continued

| | Example | |
|---|---|---|
| | 2b | 2a |
| Stress @ 200 (MPa) | 1.75 | 6.03 |
| Stress @ 300 (MPa) | 2.57 | 12.37 |
| DIN ABRASION | | |
| Abrasion Volume Loss (mm$^3$) | 418 | 152 |
| COMPOUND MOONEY SCORCH | | |
| Test Temperature (° C.) | 135 | 135 |
| t Value t03 (min) | 15.31 | 12.83 |
| t Value t18 (min) | >30 | 20.28 |
| MDR CURE CHARACTERISTICS | | |
| Frequency (Hz) | 1.7 | 1.7 |
| Test Temperature (° C.) | 170 | 170 |
| Degree Arc (°) | 1 | 1 |
| Test Duration (min) | 60 | 60 |
| Torque Range (dN · m) | 100 | 100 |
| Chart No. | 654 | 2082 |
| MH (dN · m) | 26.14 | 22.89 |
| ML (dN · m) | 13.8 | 6.54 |
| Delta MH − ML (dN · m) | 12.34 | 16.35 |
| ts 1 (min) | 0.3 | 1.32 |
| ts 2 (min) | 0.36 | 2.28 |
| t' 10 (min) | 0.27 | 1.92 |
| t' 25 (min) | 0.47 | 3.74 |
| t' 50 (min) | 4.14 | 7.17 |
| t' 90 (min) | 37.47 | 19.07 |
| t' 95 (min) | 48.01 | 22.96 |
| Delta t'50 − t'10 (min) | 3.87 | 5.25 |

TABLE 5

| Silica Preparation | | |
|---|---|---|
| Silica Modifier | 1.45 HMDZ/2.8 DMAE | None |
| Example | 3a | 3b |
| HiSil 233 (g) | 442.54 | 442.54 |
| Hexanes (mL) | 3000 mL | 3000 mL |
| DMAE (mL) | 23.28 | 0 |
| HMDZ (mL) | 14.08 | 0 |

| Bromobutyl Compound | | |
|---|---|---|
| | PHR | PHR |
| BB2030 | 100 | 100 |
| Silica | 60 | 60 |
| Sulfur | 0.5 | 0.5 |
| Stearic Acid | 1 | 1 |
| ZnO | 1.5 | 1.5 |

TABLE 6

| | Example | |
|---|---|---|
| | 3b | 3a |
| STRESS STRAIN (DUMBELLS) | | |
| Silica Modifier | None | 1.45 HMDZ/2.8 DMAE |
| Cure Time (min) | 43 | 28 |
| Cure Temperature (° C.) | 170 | 170 |
| Dumbell | Die C | Die C |
| Test Temperature (° C.) | 23 | 23 |
| Hardness Shore A2 (pts.) | 67 | 49 |
| Ultimate Tensile (MPa) | 7.56 | 20.83 |
| Ultimate Elongation (%) | 715 | 553 |
| Stress @ 25 (MPa) | 1.43 | 0.765 |
| Stress @ 50 (MPa) | 1.36 | 1.02 |
| Stress @ 100 (MPa) | 1.35 | 1.61 |

TABLE 6-continued

| | Example | |
|---|---|---|
| | 3b | 3a |
| Stress @ 200 (MPa) | 1.75 | 4.29 |
| Stress @ 300 (MPa) | 2.57 | 9.45 |
| DIN ABRASION | | |
| Abrasion Volume Loss (mm$^3$) | 418 | 208 |
| COMPOUND MOONEY SCORCH | | |
| Test Temperature (° C.) | 135 | 135 |
| t Value t03 (min) | 15.31 | >30 |
| t Value t18 (min) | >30 | >30 |
| MDR CURE CHARACTERISTICS | | |
| Frequency (Hz) | 1.7 | 1.7 |
| Test Temperature (° C.) | 170 | 170 |
| Degree Arc (°) | 1 | 1 |
| Test Duration (min) | 60 | 60 |
| Torque Range (dN · m) | 100 | 100 |
| Chart No. | 654 | 2083 |
| MH (dN · m) | 26.14 | 18.55 |
| ML (dN · m) | 13.8 | 4.75 |
| Delta MH − ML (dN · m) | 12.34 | 13.8 |
| ts 1 (min) | 0.3 | 1.62 |
| ts 2 (min) | 0.36 | 3.42 |
| t' 10 (min) | 0.27 | 2.28 |
| t' 25 (min) | 0.47 | 5.19 |
| t' 50 (min) | 4.14 | 9.55 |
| t' 90 (min) | 37.47 | 23.04 |
| t' 95 (min) | 48.01 | 27.77 |
| Delta t'50 − t'10 (min) | 3.87 | 7.27 |

TABLE 7

| Silica Preparation | | |
|---|---|---|
| Silica Modifier | 1.45 HMDZ/3.0 DMAE | None |
| Example | 4a | 4b |
| HiSil 233 (g) | 441.84 | 441.84 |
| Hexanes (mL) | 3000 mL | 3000 mL |
| DMAE (mL) | 24.91 | 0 |
| HMDZ (mL) | 14.05 | 0 |

| Bromobutyl Compound | | |
|---|---|---|
| | PHR | PHR |
| BB2030 | 100 | 100 |
| Silica | 60 | 60 |
| Sulfur | 0.5 | 0.5 |
| Stearic Acid | 1 | 1 |
| ZnO | 1.5 | 1.5 |

TABLE 8

| | Example | |
|---|---|---|
| | 4b | 4a |
| STRESS STRAIN (DUMBELLS) | | |
| Silica Modifier | None | 1.45 HMDZ/3.0 DMAE |
| Cure Time (min) | 43 | 28 |
| Cure Temperature (° C.) | 170 | 170 |
| Dumbell | Die C | Die C |
| Test Temperature (° C.) | 23 | 23 |
| Hardness Shore A2 (pts.) | 67 | 49 |
| Ultimate Tensile (MPa) | 7.56 | 21.18 |
| Ultimate Elongation (%) | 715 | 542 |
| Stress @ 25 (MPa) | 1.43 | 0.783 |
| Stress @ 50 (MPa) | 1.36 | 1.05 |
| Stress @ 100 (MPa) | 1.35 | 1.69 |

TABLE 8-continued

| | Example | |
|---|---|---|
| | 4b | 4a |
| Stress @ 200 (MPa) | 1.75 | 4.75 |
| Stress @ 300 (MPa) | 2.57 | 10.32 |
| DIN ABRASION | | |
| Abrasion Volume Loss (mm³) | 418 | 160 |
| COMPOUND MOONEY SCORCH | | |
| Test Temperature (° C.) | 135 | 135 |
| t Value t03 (min) | 15.31 | 26.48 |
| t Value t18 (min) | >30 | >30 |
| MDR CURE CHARACTERISTICS | | |
| Frequency (Hz) | 1.7 | 1.7 |
| Test Temperature (° C.) | 170 | 170 |
| Degree Arc (°) | 1 | 1 |
| Test Duration (min) | 60 | 60 |
| Torque Range (dN · m) | 100 | 100 |
| Chart No. | 654 | 2084 |
| MH (dN · m) | 26.14 | 18.96 |
| ML (dN · m) | 13.8 | 4.87 |
| Delta MH – ML (dN · m) | 12.34 | 14.09 |
| ts 1 (min) | 0.3 | 1.68 |
| ts 2 (min) | 0.36 | 3.36 |
| t' 10 (min) | 0.27 | 2.4 |
| t' 25 (min) | 0.47 | 5.11 |
| t' 50 (min) | 4.14 | 9.34 |
| t' 90 (min) | 37.47 | 22.54 |
| t' 95 (min) | 48.01 | 26.97 |
| Delta t'50 – t'10 (min) | 3.87 | 6.94 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a filled halobutyl elastomer which comprises
    reacting at least one mineral filler with at least one organic compound containing at least one basic nitrogen-containing group and at least one hydroxyl group to form a pre-reacted filler, wherein the organic compound comprises a primary alcohol group and an amine group separated by methylene bridges, which may be branched; and
    admixing at least one halobutyl elastomer with the pre-reacted filler and optionally at least one silazane compound.

2. The process according to claim 1, wherein the silazane compound is an organic silazane compound.

3. The process according to claim 2, wherein the silazane compound is a disilazane compound.

4. The process according to claim 1, wherein the mineral filler is selected from the group consisting of regular or highly dispersable silica, silicates, clay, gypsum, alumina, titanium dioxide, talc and mixtures thereof.

5. The process according to claim 1, wherein the halogenated butyl elastomer is a brominated butyl elastomer.

6. The process according to claim 1, wherein the amount of the organic compound containing at least one basic nitrogen-containing group and at least one hydroxyl group is in the range of from 0.5 to 10 parts per hundred parts of elastomer.

7. The process according to claim 1, wherein the amount of silazane is in the range of from 0.5 to 10 parts per hundred parts of elastomer.

8. A method of improving the abrasion resistance of a filled, cured elastomer composition comprising
    reacting at least one mineral filler with at least one organic compound containing at least one basic nitrogen-containing group and at least one hydroxyl containing group to make a pre-reacted filler, wherein the organic compound comprises a primary alcohol group and an amine group separated by methylene bridges, which may be branched;
    admixing the pre-reacted filler with an elastomer to make an elastomer composition; and
    curing the elastomer composition.

9. The process according to claim 1, comprising admixing a silazane compound.

10. A process for preparing a filled halobutyl elastomer which comprises
    reacting at least one mineral filler with at least one organic compound containing at least one basic nitrogen-containing group and at least one hydroxyl group to form a pre-reacted filler, wherein the organic compound comprises a carboxylic acid group and an amine group separated by methylene bridges, which may be branched; and
    admixing at least one halobutyl elastomer with the pre-reacted filler and optionally at least one silazane compound.

11. The process according to claim 10, wherein the silazane compound is an organic silazane compound.

12. The process according to claim 11, wherein the silazane compound is a disilazane compound.

13. The process according to claim 10, wherein the mineral filler is selected from the group consisting of regular or highly dispersable silica, silicates, clay, gypsum, alumina, titanium dioxide, talc and mixtures thereof.

14. The process according to claim 10, wherein the halogenated butyl elastomer is a brominated butyl elastomer.

15. The process according to claim 10, wherein the amount of the organic compound containing at least one basic nitrogen-containing group and at least one hydroxyl group is in the range of from 0.5 to 10 parts per hundred parts of elastomer.

16. The process according to claim 10, wherein the amount of silazane is in the range of from 0.5 to 10 parts per hundred parts of elastomer.

17. The process according to claim 10, comprising admixing a silazane compound.

18. A process for preparing a filled halobutyl elastomer which comprises
    reacting at least one mineral filler with at least one organic compound containing at least one basic nitrogen-containing group and at least one hydroxyl group to form a pre-reacted filler, wherein the organic compound is selected from the group consisting of monoethanolamine, N,N,-dimethylamino-ethanol, a natural or synthetic amino acid and protein; and
    admixing at least one halobutyl elastomer with the pre-reacted filler and optionally at least one silazane compound.

19. The process according to claim 18, wherein the silazane compound is an organic silazane compound.

20. The process according to claim 19, wherein the silazane compound is a disilazane compound.

21. The process according to claim 18, wherein the mineral filler is selected from the group consisting of regular or highly dispersable silica, silicates, clay, gypsum, alumina, titanium dioxide, talc and mixtures thereof.

22. The process according to claim 18, wherein the halogenated butyl elastomer is a brominated butyl elastomer.

23. The process according to claim 18, wherein the amount of the organic compound containing at least one basic nitrogen-containing group and at least one hydroxyl group is in the range of from 0.5 to 10 parts per hundred parts of elastomer.

24. The process according to claim 18, wherein the amount of silazane is in the range of from 0.5 to 10 parts per hundred parts of elastomer.

25. The process according to claim 18, comprising admixing a silazane compound.

26. A method of improving the abrasion resistance of a filled, cured elastomer composition comprising reacting at least one mineral filler with at least one organic compound containing at least one basic nitrogen-containing group and at least one hydroxyl containing group to make a pre-reacted filler, wherein the organic compound comprises a carboxylic acid group and an amine group separated by methylene bridges, which may be branched;

admixing the pre-reacted filler with an elastomer to make an elastomer composition; and curing the elastomer composition.

27. A method of improving the abrasion resistance of a filled, cured elastomer composition comprising reacting at least one mineral filler with at least one organic compound containing at least one basic nitrogen-containing group and at least one hydroxyl containing group to make a pre-reacted filler, wherein the organic compound is selected from the group consisting of monoethanolamine, N,N,-dimethylamino-ethanol, a natural or synthetic amino acid and protein;

admixing the pre-reacted filler with an elastomer to make an elastomer composition; and curing the elastomer composition.

* * * * *